United States Patent
Lancaster et al.

(10) Patent No.: US 7,174,442 B2
(45) Date of Patent: Feb. 6, 2007

(54) DATA ADDRESSING (75) Inventors: John Lancaster, High Wycombe (GB); Martin Whitaker, High Wycombe (GB)

(73) Assignee: Aspex Technology Limited, Buckinghamshire (GB)

(*) Notice: Subject to any disclaimer, the term of this patent is extended or adjusted under 35 U.S.C. 154(b) by 166 days.

(21) Appl. No.: 10/432,203

(22) PCT Filed: Nov. 21, 2001

(86) PCT No.: PCT/GB01/05126

§ 371 (c)(1),
(2), (4) Date: Oct. 29, 2003

(87) PCT Pub. No.: WO02/42906

PCT Pub. Date: May 30, 2002

(65) Prior Publication Data

US 2004/0064670 A1    Apr. 1, 2004

(30) Foreign Application Priority Data

Nov. 21, 2000   (GB) ................................. 0028354.9

(51) Int. Cl.
*G06F 12/00*    (2006.01)
(52) U.S. Cl. ........................ 711/213; 711/217; 711/218; 710/22

(58) Field of Classification Search .................... None
See application file for complete search history.

(56) References Cited

U.S. PATENT DOCUMENTS

| | | | |
|---|---|---|---|
| 4,727,474 A * | 2/1988 | Batcher ....................... 712/14 |
| 5,155,823 A | 10/1992 | Tsue |
| 5,467,459 A | 11/1995 | Alexander et al. |
| 5,835,788 A * | 11/1998 | Blumer et al. ................ 710/23 |
| 6,070,003 A * | 5/2000 | Gove et al. .................. 710/317 |
| 6,131,092 A * | 10/2000 | Masand ......................... 707/6 |
| 2001/0052062 A1 * | 12/2001 | Lipovski ...................... 712/32 |
| 2004/0064670 A1 * | 4/2004 | Lancaster et al. ........... 711/202 |

OTHER PUBLICATIONS

Lea, ASP Modules: Cost-Effective Building-Blocks for Real-Time DSP System, Journal of VLSI Signal Processing, 1989, pp. 69-84, Kluwer Academic Publishers, Boston.

* cited by examiner

*Primary Examiner*—Reginald Bragdon
*Assistant Examiner*—Horace L. Flournoy
(74) *Attorney, Agent, or Firm*—Dinsmore & Shohl LLP (57) ABSTRACT

A method of carrying out a data fetch operation for a data-parallel processor such as a SIMD processor is described. The operation is specifically involving the use of a plurality of non-sequential data addresses. The method comprises constructing a linear address vector from the non-sequential addresses, and using the address vector in a block fetch command to a data store.

16 Claims, 7 Drawing Sheets

| ADDRESS MEMORY MAP ||
| --- | --- |
| Memory Location Address | Actual External Data Address Stored as Data |
| 4127 2500 | 0897 3984 7009 3423 |
| 4127 2501 | 0945 9787 9870 7155 |
| 4127 2502 | 5686 3854 5465 8468 |
| 4127 2503 | 6546 5468 4621 6541 |
| 4127 2504 | 9879 8842 4835 4691 |
| 4127 2505 | 6498 2866 4853 3333 |
| 4127 2506 | 2315 4351 3543 5135 |
| 4127 2507 | 6482 7973 2131 6542 |
| 4127 2508 | 9452 5582 5825 2685 |
| . | . |
| . | . |
| . | . |
| . | . |

DATA ADDRESSING

CROSS REFERENCE TO RELATED APPLICATIONS

This application is a PCT National Phase of International Application No. PCT/GB01/05126 filed Nov. 21, 2001.

BACKGROUND OF THE INVENTION

The present invention concerns improvements relating to data addressing techniques and more particularly, though not exclusively to a method of performing address calculation for a data-parallel SIMD processor that provides enhanced performance.

Single Instruction Parallel Data (SIMD) processors are a class of data-parallel processors in which a plurality of processing elements making up the processor perform the same operation at the same time but on different data. SIMD processors have a relatively large array of identical processing elements coupled together with a single control unit. Each processing element acts as a small basic computer in that it has an Arithmetic Logic Unit (ALU) a plurality of data registers and a local data memory. The control unit functions to control simultaneously the operations carried out on each processing element and these processes basically consist of reading the data from the data memory, carrying out an operation on the data in the ALU, which may involve manipulation of the data using the data registers, and then writing the result back to memory.

Existing data-parallel SIMD processors typically process data sets loaded into the data memories of the processing elements from an external data source such as a video memory. The loaded data can then be processed in parallel by the SIMD processor. Typically, the data sets in question are highly regular data, for example two-dimensional images (such as pixel arrays) or three-dimensional volume data (such as voxel arrays). Given the inherent regularity of the data sets, the transfer of data into the distributed data memories of the data-parallel processor array can normally be accomplished by a conventional DMA (Direct Memory Access) unit, or a dedicated unit with similar (although enhanced) memory data handling functionality. Examples of this type of memory can be seen in U.S. Pat. Nos. 4,835,729 and 5,581,773.

When more complex address transformations are required, when for example the addresses of the data items are non-contiguous, then a conventional CPU (Central Processing Unit), with its complex address calculation support, actually offers superior performance over the DMA unit solution. This performance differential is still maintained even if the data processing part of the problem is inherently data-parallel. Accordingly, one performance enhancing solution is to employ a 'conventional' processor to precompute the addresses and prefetch the data vectors for the SIMD parallel processor to process.

The disadvantage of this prior art solution is that it is a non-optimal solution that does not take advantage of the inherent parallel nature of the data-parallel processor to compute the address vectors itself. Moreover, if a conventional processor is used to compute the addresses this may itself become the bottleneck, if it cannot keep pace with the enormous demand for data from the parallel processor or, conversely, if the address computational task is too onerous.

Figure 1:
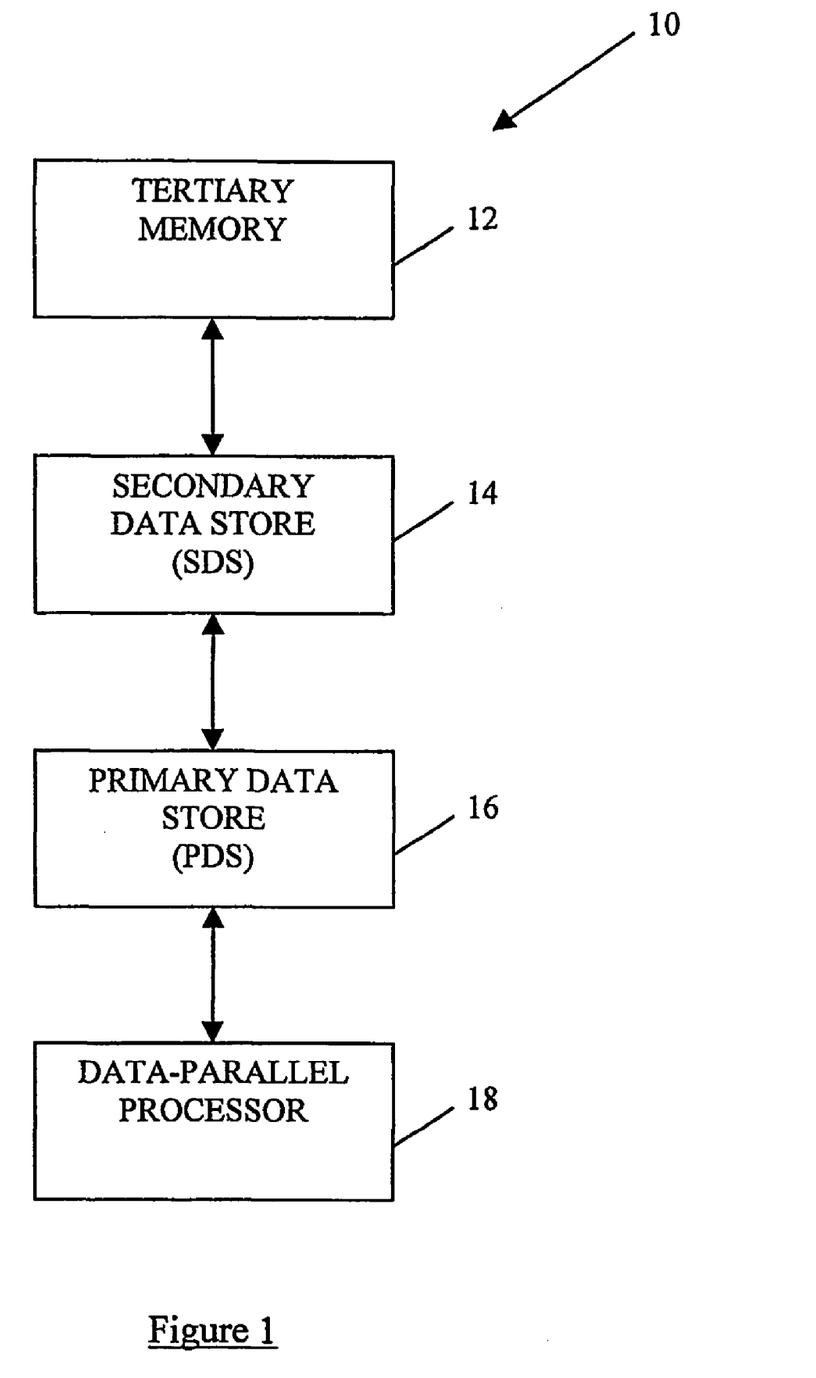
FIG. 1 is a schematic block diagram showing the hierarchy of system memory transfer elements of an Associative String Processor (ASP)

A specific class of SIMD processor is the ASP (Associative String Processor). This technology utilizes a hierarchy of memory transfers to secure the transfer of data from a conventional memory to the data-parallel processor. This is shown in FIG. 1 where the hierarchy of system memory transfer elements of an ASP 10 are shown. Here a tertiary memory 12 acts as a conventional memory and this is coupled in turn to a Secondary Data Store (SDS) 14, a Primary Data Store (PDS) 16 and finally a data-parallel processor 18. The SDS 14 has the ability to store regular (contiguous) data and to supply that regular data to the PDS in an optimized manner as has been described above in relation to a DMA data transfer. However, the SDS 14 also stores non-contiguous data which is supplied in a non-optimal manner. The PDS 16 is tightly coupled to the data-parallel processor 18 and is analogous to a data cache.

Figure 2:
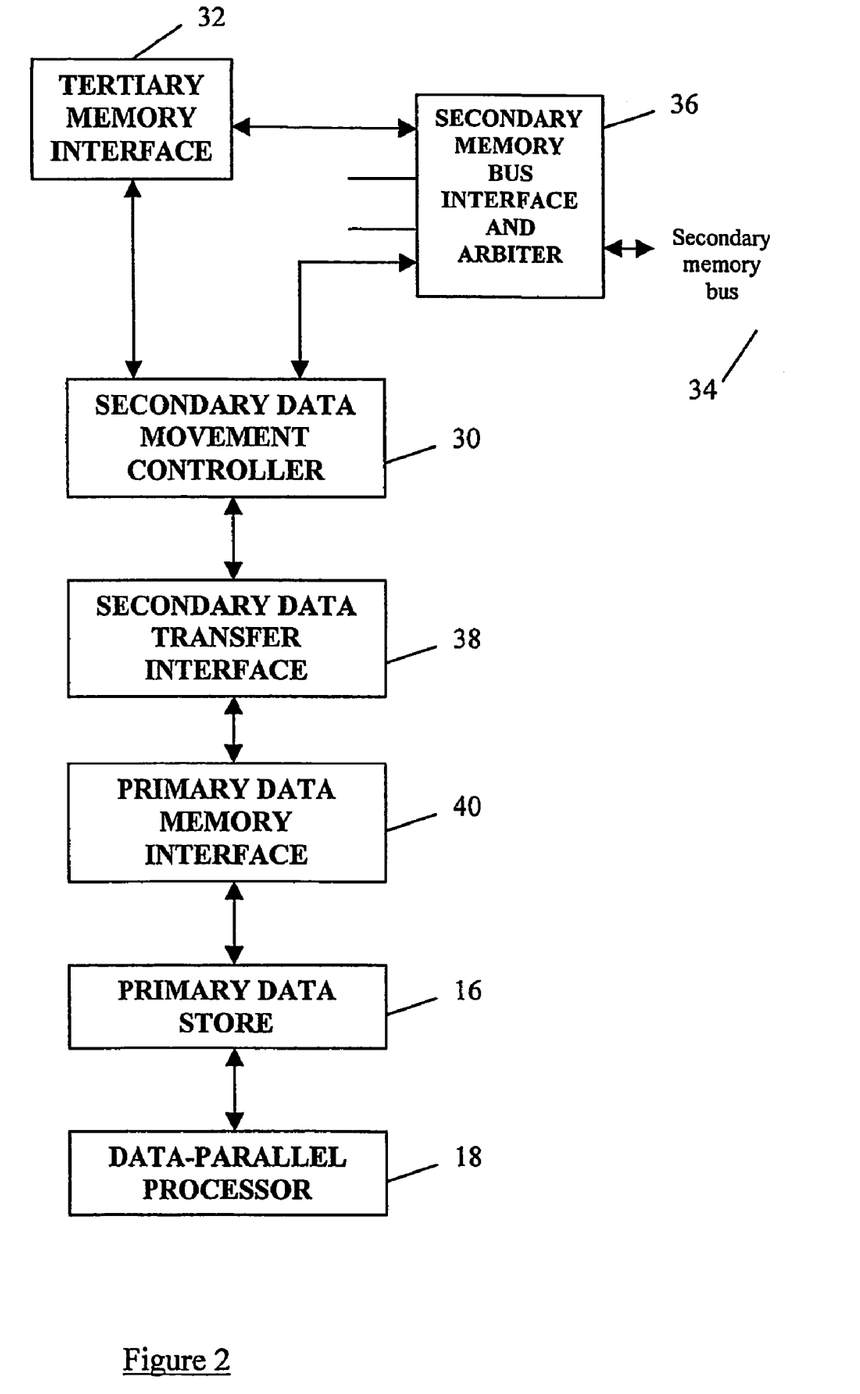
FIG. 2 is a schematic block diagram showing the elements comprising a Secondary Data Store (SDS) and its connection to the data parallel processor.

More specifically, referring to FIG. 2 a memory access controller 28 of a conventional ASP 10 comprises at its heart a Secondary Data Movement Controller (SMDC) 30 which generates addresses and coordinates data transfers to and from the data-parallel processor 18 and external memories. One such external memory is the SDS 14 and data is supplied and stored to the SDS 14 via a secondary data memory bus 34. Also, the SDMC 30 is coupled to tertiary memory 12 via a tertiary memory interface 32. The data memory bus 34 is controlled by a Secondary Memory Bus Interface and Arbiter (bus arbiter) 36 which handles requests for data generated by the SMDC 30 and the transfer of data to the SMDC 30 from the SDS 14. As has been described previously, the SDS 14 is used for storing contiguous data such as video data and the regularity of this data enables the SDMC 30 to carry out block data transfers from the SDS 14 to itself and then to onto the data-parallel processor 18. In this regard, the SDMC 30 has the role of a sophisticated DMA unit, responsible for movement of regular data sets (i.e. 2D arrays of pixels or 3D arrays of voxels).

The data transfer facilities also include a secondary data transfer interface 38 and a primary data memory interface 40 for converting data into a suitable format for transmission between the primary data store and the SDMC 30. Accordingly, a coordinating processor generates a request for a block of data involving the calculation of the required data's addresses. This is transmitted to the SDMC 30 and the resulting data is obtained from the SDS 14. Typically, data transfers for contiguous data in the SDS 14 is transferred in a relatively fast manner using the SDMC 30 as a DMA controller. Otherwise, discrete addressing of memory is used to fetch the required data which is relatively slow. This is particularly the case when the data-parallel processor 18 requires non-contiguous (non-sequential) addresses that cannot be used in a block data transfer operation.

It is desired to overcome or at least substantially reduce at least some of the above described problems/disadvantages.

SUMMARY OF THE INVENTION

The present inventors have realized that it is advantageous to have an address calculation schema for a data-parallel processor which enables high-speed processing of both contiguous (sequential) and non-contiguous (non-sequential) address data and that this can be achieved simply by modifying the appearance of the address data, regardless of whether it is contiguous or non-contiguous, such that it can always be treated as contiguous address data by the processor. Stated differently, the present invention involves data-parallel processors composing address vectors for their data fetch cycle for all their address data (contiguous or non-contiguous).

The clear advantage of this is that the faster address calculation and data fetching techniques usually only applicable to contiguous address data can be employed for all addressed data, thereby avoiding bottlenecks in supplying data to the data-parallel processor. Also, the present invention allows data-parallel (SIMD) processors to exploit their superior parallel processing numeric capabilities to perform address calculation.

According to one broad aspect of the present invention there is provided a method of carrying out a data fetch operation, for a data-parallel processor, involving the use of a plurality of non-sequential data addresses, the method comprising: constructing a linear address vector from the non-sequential addresses; and using the address vector in a block fetch command to a data store.

More specifically, the present invention concerns a method of fetching data for processing on a data-parallel processor, the method comprising: generating a plurality of non-linear data addresses for accessing data stored in a data store; storing each of the non-linear addresses sequentially in a linear array to form an address vector; reading out the address vector from the linear array to the data store; retrieving from the data store the data stored at the plurality of non-linear addresses specified by the address vector; and providing the read data to the data-parallel processor.

The present invention offers the data-parallel processor programmer the freedom to define nonlinear address mappings, computed in parallel by the data-parallel processor, and then utilized concurrently with further processing to fetch the next data set for processing.

The present invention can be implemented in different ways and the three different embodiments of described herein reflect different strategies which offer different compromises of price-performance.

Firstly, an address memory can be coupled to a Secondary Data Memory Controller SMDC whereby data from the data-parallel processor, which comprises a linear array of non-linearly pre-computed addresses is fetched by the SDMC and stored into the address memory. Subsequently, this array of addresses may be used accessed linearly by the SDMC and routed to the secondary memory as a sequence of addresses for performing a data fetch operation.

The disadvantages of the first embodiment is that there is a need to create a separate memory, sized to match the number of processing elements in the data-parallel processor, and that the data fetch is split into an address fetch and a data fetch cycle. The latter drawback can be mitigated by appropriately pipelining the blocks of fetch cycles.

The second embodiment requires no additional memory requirement but rather uses the memory of the PDS by dividing it into at least two banks of data. One of those banks provides the address memory of the first embodiment which enables the formation of the address vector, whilst the other bank operates as a conventional PDS. This lower cost solution has the disadvantage that the amount of PDS available for conventional purposes is reduced and the data fetch latency is potentially increased.

According to another aspect of the present invention, there is provided a combination of a data-parallel processor and an apparatus for fetching data for processing on the data-parallel processor, the combination comprising: an address generator for generating a plurality of non-linear data addresses for accessing data stored in a main data store; a temporary data store comprising a linear array, the store being arranged to store each of the non-linear addresses sequentially in the linear array to form an address vector; a data retrieval controller arranged to read the address vector, to use the same to retrieve from the main data store the data stored at the plurality of non-linear addresses specified by the address vector, and to supply the read data to the data-parallel processor.

The present invention also extends to an apparatus for use with a data-parallel processor for carrying out a data fetch operation involving the use of a plurality of non-sequential data addresses, the apparatus comprising: an address vector generation means for converting the non-sequential data addresses into a linear address vector; and a data fetch controller arranged to use the address vector in a block fetch command to a data store.

Preferred embodiments of the present invention will now be described by way of example with reference to the accompanying drawings.

DETAILED DESCRIPTION OF THE PREFERRED EMBODIMENTS

Figure 3:
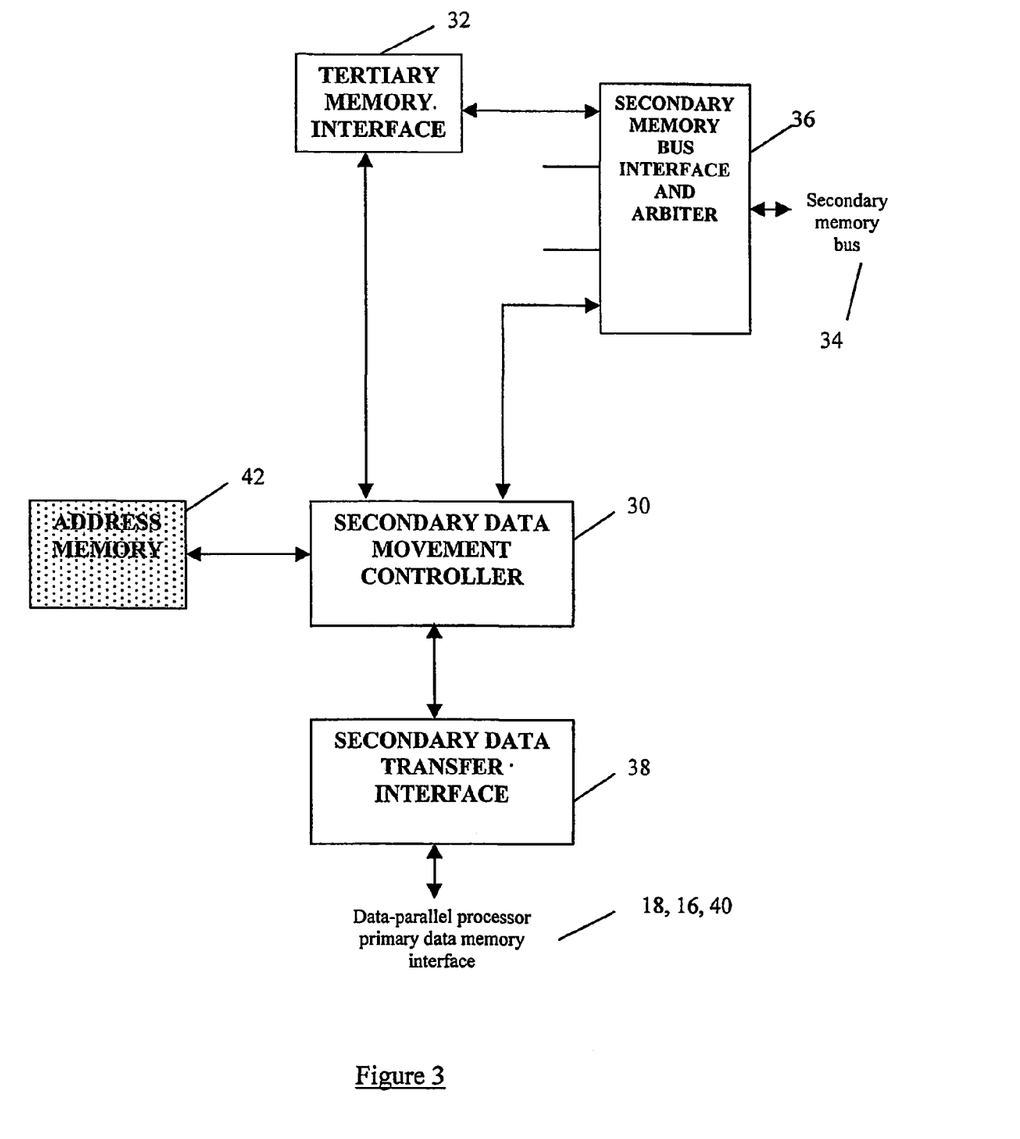
FIG. 3 is a schematic block diagram showing the SDS of an ASP according to a first embodiment of the present invention.

FIG. 3 shows a memory access controller 28 used with an ASP data-parallel processor 18 according to a first embodiment of the present invention. The memory access controller 28 is identical in hardware to the conventional memory access controller 28 shown in FIG. 2 except for the provision of an address memory 42 which is connected to the SDMC 30. For the avoidance of unnecessary repetition, only the differences between the conventional memory access controller and the first embodiment will be described hereinafter.

Figure 4:
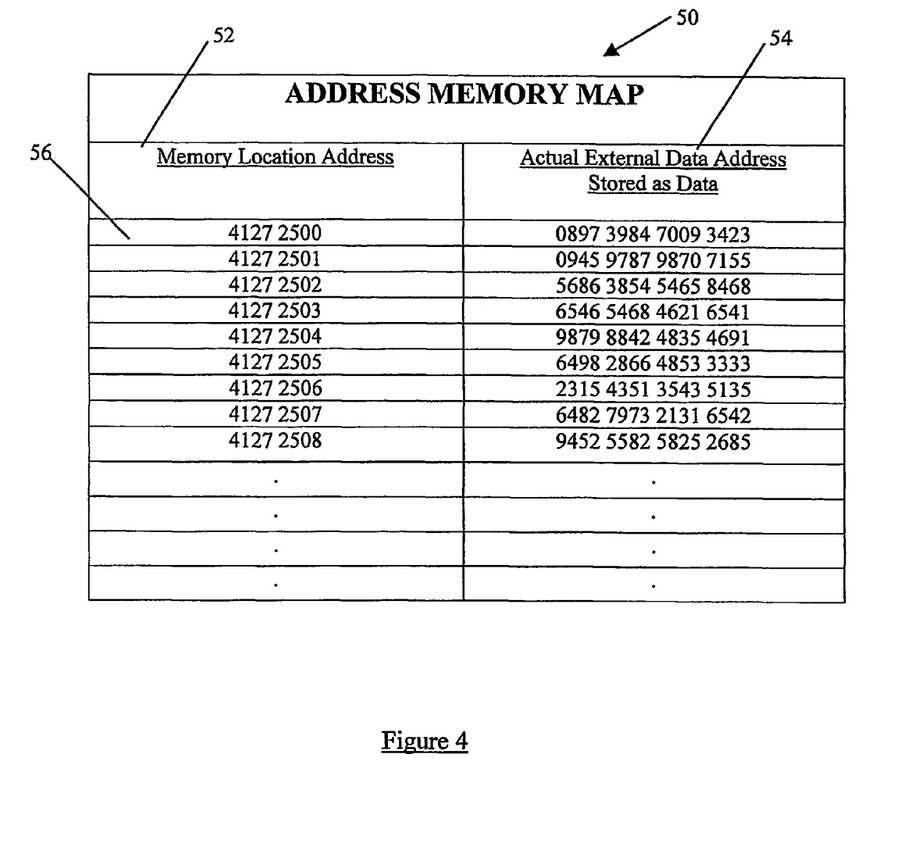
FIG. 4 is a schematic block diagram showing an exemplary address map of the address data stored in an address memory of the SDS of FIG. 3.

FIG. 4 shows the actual configuration (address memory map 50) of the address memory 42 in detail. The address memory 42 is divided into a column of contiguous memory locations 52 and a column of data fields for storing actual external addresses 54 that are non-contiguous. Each element 56 of the contiguous memory location column 52 has a corresponding data field in the data field column 54.

The address memory 42 has a sufficient number of elements 56 to handle a single address being generated by each of the processing elements (not shown) of the ASP data-parallel processor 18 and in the present embodiment this is 4096 data address storage elements 56.

Figure 5:
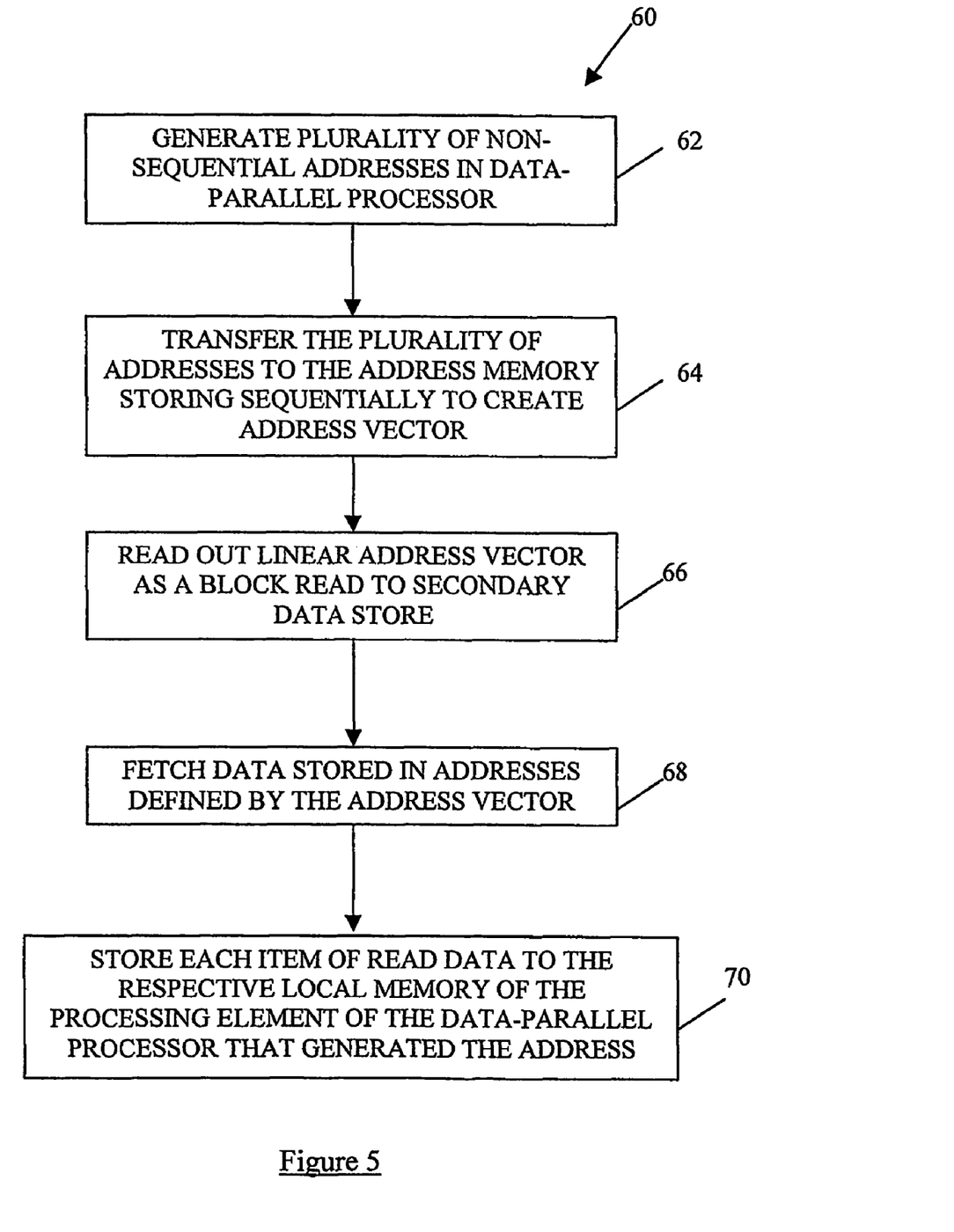
FIG. 5 is a flow diagram showing the steps involved in a data fetch operation using the SDS shown in FIG. 3.

The provision of the address memory 42 enables a new method of carrying out a data fetch operation according to the present invention to be implemented. Referring now to FIG. 5, the way in which the memory access controller 28 is used is now described. The method 60 of carrying out a data fetch operation commences with the generation at Step 62 of a plurality of non-sequential addresses in the data-parallel processor 18. Here each data processing element generates its own required address for the data it wishes to process. These addresses are then transferred at Step 64 to the address memory 42 via the SMDC 30. The addresses are stored sequentially in the data field column 54 with each memory location address incrementing sequentially for each new data address, thereby creating an address vector. Each memory location address is associated with a unique one of the data processing elements such that when data is retrieved from the specified data address, it can be directed back to the originating processing element in the data-parallel processor 18.

The linear address vector (list of sequential memory location addresses together with their data addresses) is then read out at Step 66 as a block data read to the SDS 14 via the SMDC 30 and the Secondary Memory Bus Interface and Arbiter 36. The SMDC 30 uses the data addresses to fetch at Step 68 the relevant data stored in the SDS 14 at the data addresses specified by the address vector. The read data is fetched back to the SMDC 30 and then at Step 70 each data item corresponding to a specific data address is directed to the respective local memory of the processing element of the data-parallel processor 18 that generated the data address. This is possible because of the unique relationship between each processing element and the position at which its generated address is stored in the address vector.

Figure 6:
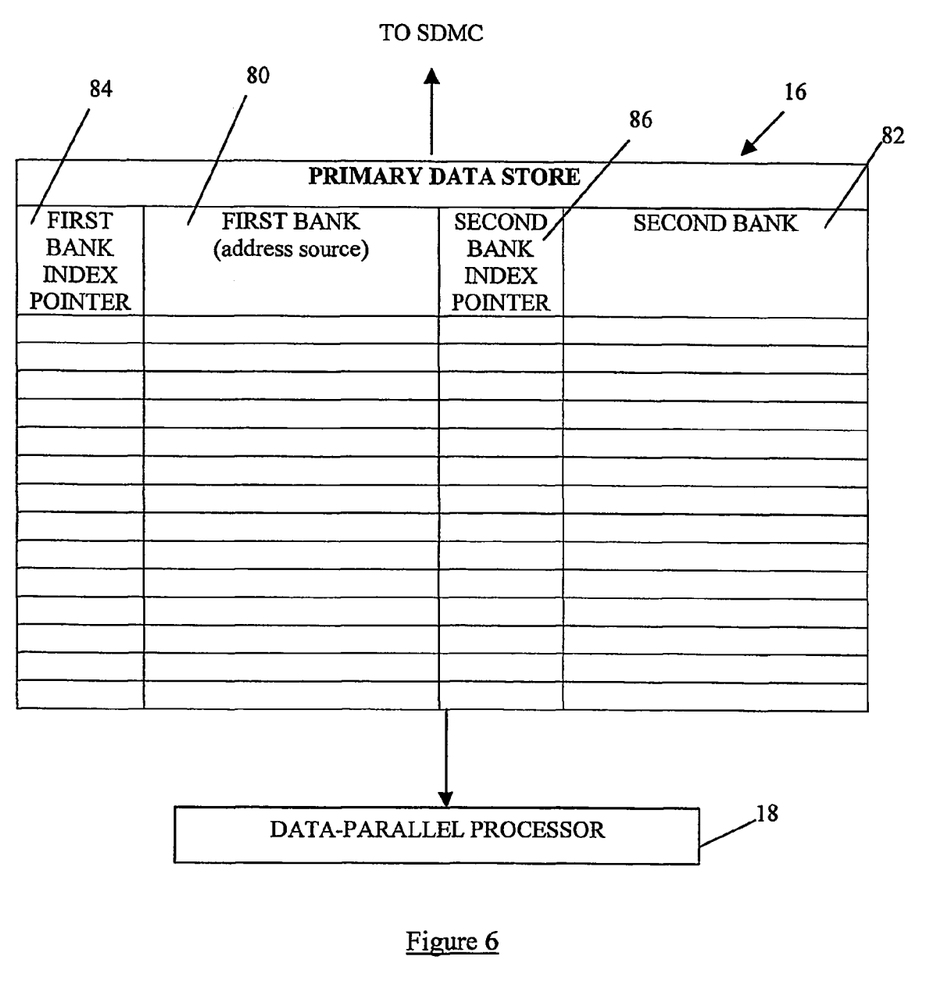
FIG. 6 is a schematic block diagram showing the Primary Data Store of an ASP according to a second embodiment of the present invention.

Referring now to FIG. 6, a second embodiment of the present invention is now described. This embodiment is similar to the first embodiment and to avoid unnecessary repetition, only the differences will be described herein. This embodiment offers an attractive solution since the address vector memory is incorporated into the data parallel processor. Consequently, it scales perfectly in size and speed with the parallel processor, it requires no additional control overhead and it reduces the area associated with incorporating a separate memory module.

The main difference between the first and second embodiments is that the memory access controller 28 of the second embodiment does not have an additional address memory 42 attached to the SDMC 30. Rather, the memory access controller 28 utilizes a modified PDS 16 to provide the means for generating the data address vector as well as functioning in its normal mode as a type of local fast data memory for the data-parallel processor, namely as a dual-mode PDS.

More specifically, the present embodiment utilizes a partitioned PDS 16 which comprises a first bank 80 and a second bank 82. Each of the two banks are accessed independently for read and write operations, but remain tightly coupled to the data-parallel processor 18. The first bank 80 (or the second bank in an alternative embodiment) is designated as the address source. The first bank also includes an index pointer 84 and the second bank includes an index pointer 86. These independent index pointers enable the banks to be indexed independently so as to allow for the (sometimes severe and non-deterministic) pipeline delay in fetching data from the external (secondary) memory.

The way in which the partitioned PDS 16 would be used is the same as that specified in the first embodiment except for the fact that the data addresses would be generated and stored in the first bank 80 under the control of the processing elements of the data-parallel processor 18. Only once the complete address vector has been created within the PDS 16, would the SMDC 30 be used to execute the data fetch operation using the first bank 80 of the PDS as the address source. As each index 84 into the first bank relates to a unique processing element of the data-parallel processor 18, in this embodiment the retrieved data is naturally and easily distributed to the originating processing elements requiring the data.

Figure 7:
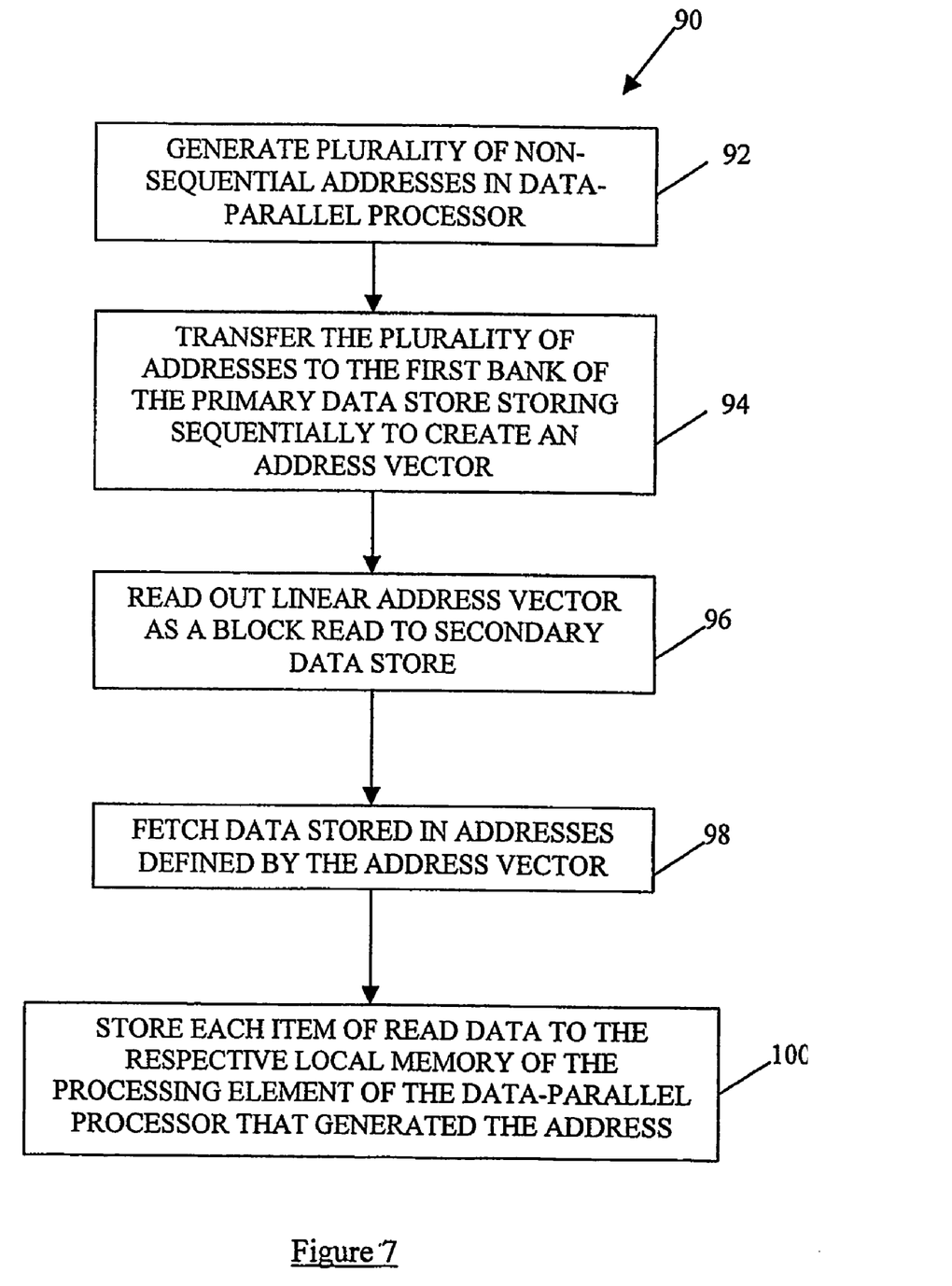
FIG. 7 is a flow diagram showing the steps involved in a data fetch operation using the SDS shown in FIG. 6.

More specifically referring now to FIG. 7, the way in which the second embodiment of the present invention is used is now described. The method 90 of carrying out a data fetch operation commences with the generation at Step 92 of a plurality of non-sequential addresses in the data-parallel processor 18. Each data processing element generates its own required address for the data it wishes to process. These addresses are then transferred at Step 94 to the first bank of the PDS 14. The addresses are stored sequentially in the first bank 80, thereby creating an address vector. Each address is associated with a unique one of the data processing elements such that when data is retrieved from the specified data address, it can be directed back to the originating processing element in the data-parallel processor 18.

The linear address vector is then read out at Step 96 as a block data read to the SDS 14 via the SMDC 30 and the Secondary Memory Bus Interface and Arbiter 36. The SMDC 30 uses the data addresses to fetch at Step 98 the relevant data stored in the SDS 14 at the data addresses specified by the address vector. The read data is fetched back to the SMDC 30 and then at Step 100 each data item corresponding to a specific data address is directed to the respective local memory of the processing element of the data-parallel processor 18 that generated the data address. This is possible because of the unique relationship between each processing element and the index number position at which its generated address is stored in the address vector.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims. For example, the present invention is not restricted to ASP technology and can be applied to any data-parallel processor technology.

The invention claimed is:

1. A method of fetching data from a data store for processing on a data-parallel processor, the method comprising:

generating a plurality of non-linear data addresses for accessing data stored in the data store;

storing each of the non-linear addresses sequentially in a linear array to form an address vector;

reading out the address vector from the linear array to the data store;

retrieving from the data store the data stored at the plurality of non-linear addresses specified by the address vector; and providing the read data to the data-parallel processor.

2. A method according to claim 1, wherein the storing step comprises storing the plurality of non-linear addresses in a data store having a size that corresponds to the number of processing elements in the data-parallel processor.

3. A method according to claim 1, further comprising creating a pipeline by carrying out the non-liner address storing step and the retrieving data steps concurrently.

4. A method according to claim 1, wherein the providing step comprises providing the read data to a plurality of processing elements of the data-parallel processor.

5. A method according to claim 1, wherein the generating step is carried out by a plurality of data processing elements of the data-parallel processor.

6. A method according to claim 1, wherein the storing step comprises storing each of the non-linear addresses in a store which is tightly coupled to the structure of the data-parallel processor and sequentially indexing each of the non-linear addresses to form an address vector.

7. A method according to claim 6, wherein the storing step comprises storing each of the non-linear addresses in a portion of a data cache of the data-parallel processor.

8. A method according to claim 1, wherein the generating step comprises generating each of the plurality of data addresses concurrently.

9. A combination of a data-parallel processor and an apparatus operatively coupled to the data processor for fetching data for processing on the data-parallel processor, the combination comprising:
- an address generator for generating a plurality of non-linear data addresses for accessing data stored in a main data store;
- a temporary data store operatively coupled to the address generator and comprising a linear array, the store being arranged to store each of the addresses of the plurality of non-linear generated addresses sequentially in the linear array to form an address vector; and
- a data retrieval controller operatively coupled to the temporary data store and the main data store and arranged to read the address vector, to use the same to retrieve from the main data store the data stored at the plurality of non-linear addresses specified by the address vector, and to supply the read data to the data-parallel processor.

10. A combination according to claim 9, wherein the address generator comprises the data-parallel processor.

11. A combination according to claim 9, wherein the address generator further comprises a data transferring controller for storing each of the generated addresses in the temporary store.

12. A combination according to claim 9, wherein the temporary data store comprises a conventional address memory.

13. A combination according to claim 9, wherein the temporary data store comprises a data memory tightly coupled to the data-parallel processor.

14. A combination according to claim 9, wherein the data retrieval controller comprises a direct memory access (DMA) controller arranged to read block of data from the main data store having sequentially stored data.

15. An apparatus for fetching data from a data store for processing on a data-parallel processor, the apparatus comprising:
- data address generator for generating a plurality of non-linear data addresses for accessing data stored in the data store;
- a temporary data store for storing each of the non-linear addresses sequentially in a linear array to form an address vector;
- reading means for reading out the address vector from the linear array to the data store;
- retrieving means for retrieving from the data store the data stored at the plurality of non-linear addresses specified by the address vector; and
- means for providing the read data to the data-parallel processor.

16. A method of fetching data from a data store for processing on a data-parallel processor having a plurality of data processing elements, the method comprising:
- generating a plurality of non-linear data addresses for accessing data stored in the data store; the generating step being carried out concurrently by the plurality of data processing elements of the data-parallel processor;
- storing each of the non-linear addresses sequentially in a linear array to form an address vector; wherein the linear array has a size that corresponds to the number of processing elements in the data-parallel processor;
- reading out the address vector from the linear array to the data store;
- retrieving from the data store the data stored at the plurality of non-linear addresses specified by the address vector; and
- providing the read data to the plurality of processing elements of the data-parallel processor.

* * * * *

UNITED STATES PATENT AND TRADEMARK OFFICE
CERTIFICATE OF CORRECTION

| | |
|---|---|
| PATENT NO. | : 7,174,442 B2 |
| APPLICATION NO. | : 10/432203 |
| DATED | : February 6, 2007 |
| INVENTOR(S) | : Lancaster et al. |

It is certified that error appears in the above-identified patent and that said Letters Patent is hereby corrected as shown below:

Col. 6, line 63 "non-liner" should read --non-linear--

Signed and Sealed this

Fifth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,174,442 B2 Page 1 of 1
APPLICATION NO. : 10/432203
DATED : February 6, 2007
INVENTOR(S) : Lancaster et al.

It is certified that error appears in the above-identified patent and that said Letters Patent is hereby corrected as shown below:

In Fig. 7, Sheet 7 of 7, delete " -10C " and insert -- -100 --, therefor.

In Column 2, Line 16, delete "(SMDC)" and insert -- (SDMC) --, therefor at each occurrence throughout the specification.

Signed and Sealed this
Twenty-seventh Day of November, 2012

David J. Kappos
*Director of the United States Patent and Trademark Office*